Nov. 5, 1940.  J. PAGE  2,220,270

PROCESS AND APPARATUS FOR PERFORATING SHEET MATERIALS

Filed Oct. 11, 1937  7 Sheets-Sheet 2

Inventor:
John Page.
By Amos, Thim, Olsen & Mechlenburger
Attys.

Nov. 5, 1940.  J. PAGE  2,220,270

PROCESS AND APPARATUS FOR PERFORATING SHEET MATERIALS

Filed Oct. 11, 1937  7 Sheets-Sheet 3

Inventor:
John Page
By Amos, Thien, Olson & Mecklenburger
Attys.

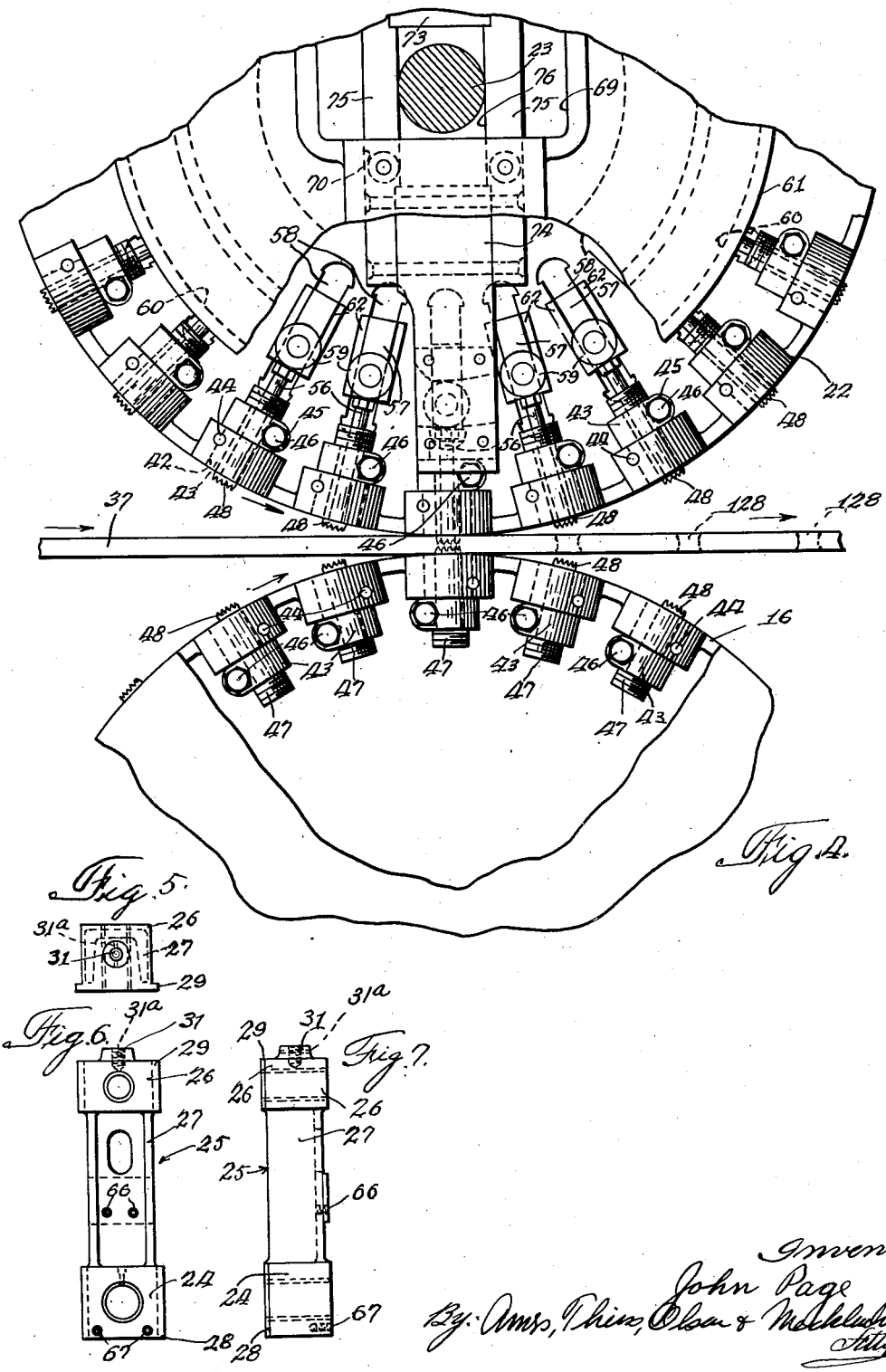

Nov. 5, 1940.   J. PAGE   2,220,270
PROCESS AND APPARATUS FOR PERFORATING SHEET MATERIALS
Filed Oct. 11, 1937   7 Sheets-Sheet 5

Inventor:
John Page.
By Ames, Thiess, Olson & Mecklenburger
Attys.

Nov. 5, 1940.                    J. PAGE                    2,220,270
        PROCESS AND APPARATUS FOR PERFORATING SHEET MATERIALS
                Filed Oct. 11, 1937         7 Sheets-Sheet 6
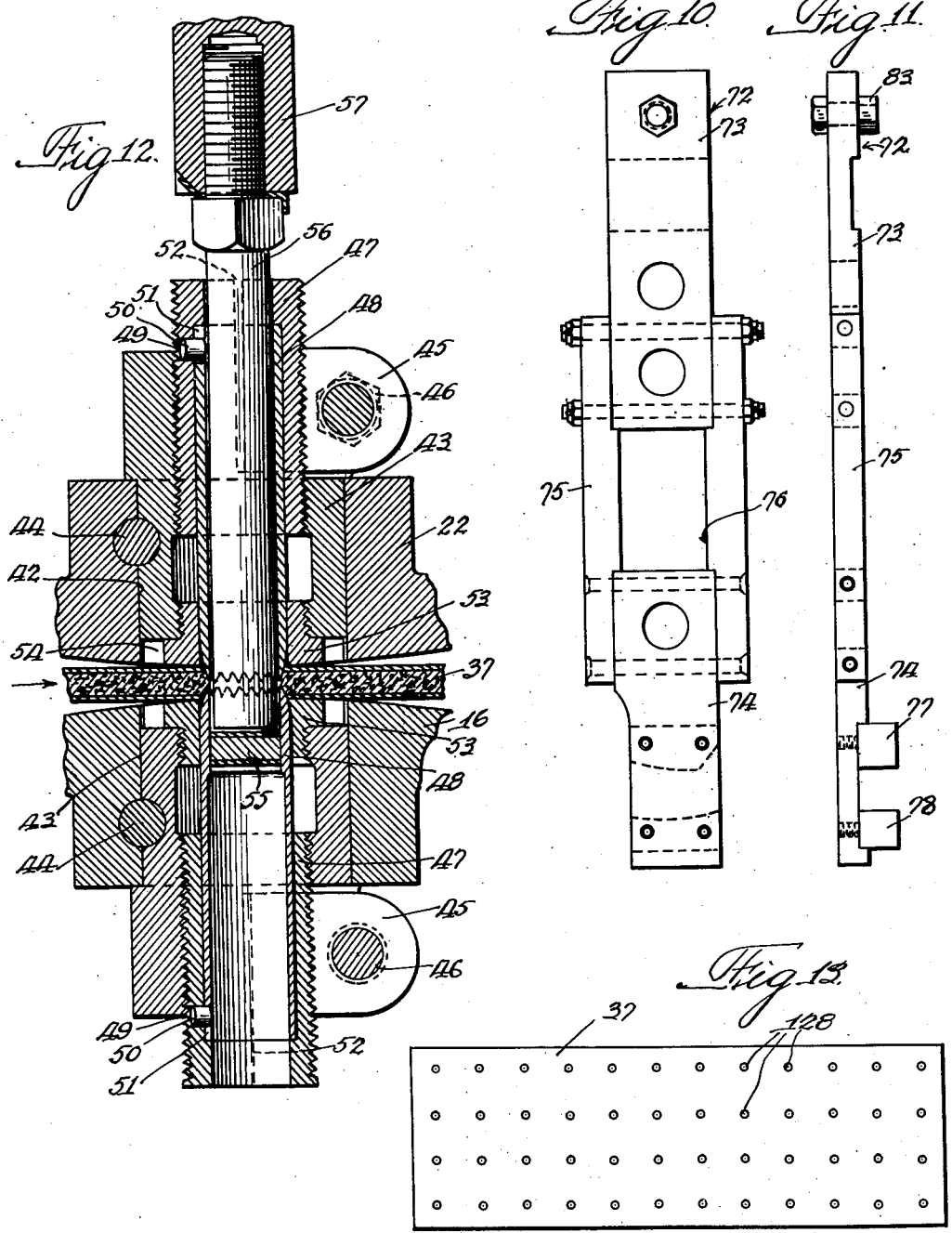

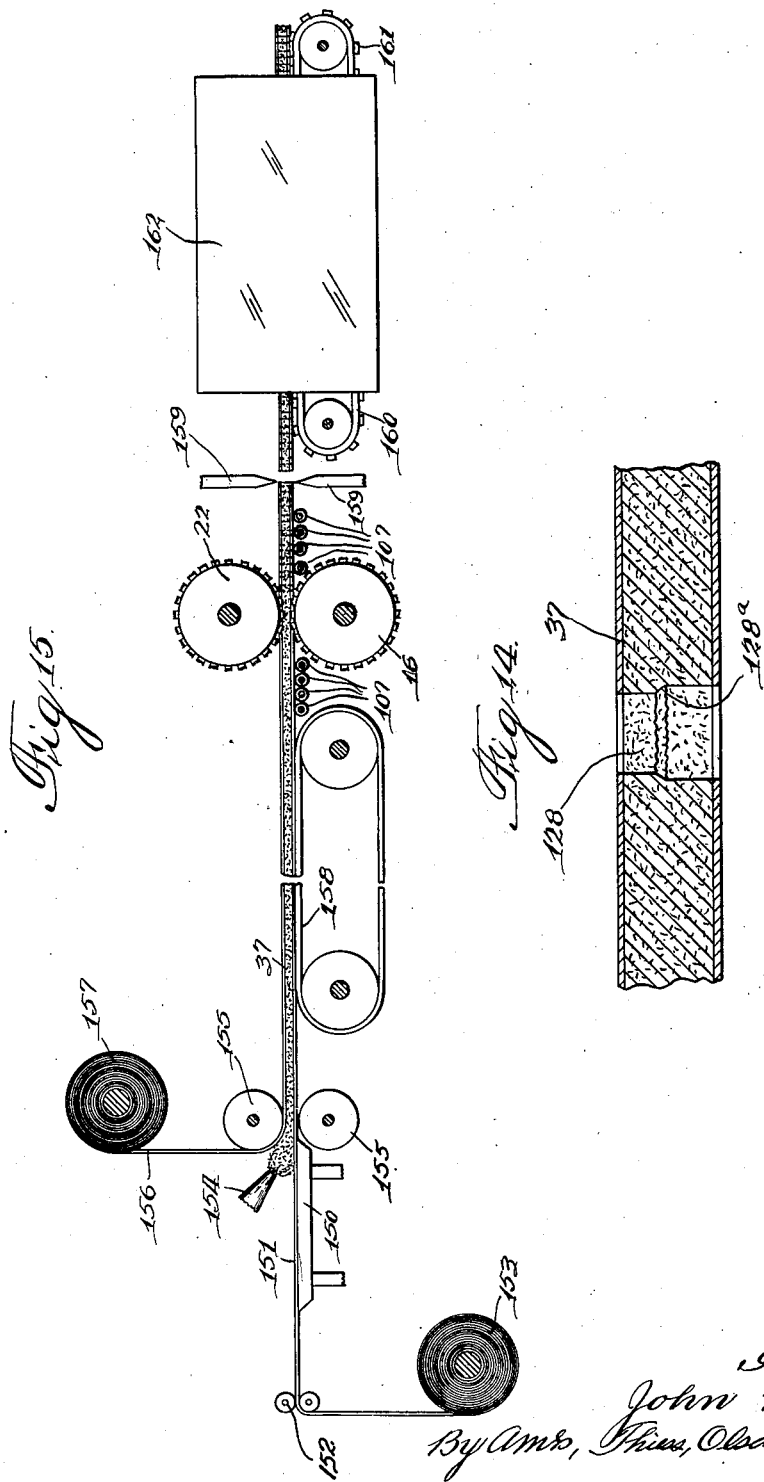

Patented Nov. 5, 1940

2,220,270

UNITED STATES PATENT OFFICE 2,220,270

PROCESS AND APPARATUS FOR PERFORATING SHEET MATERIALS

John Page, Evanston, Ill., assignor to United States Gypsum Company, Chicago, Ill., a corporation of Illinois Application October 11, 1937, Serial No. 168,343

27 Claims. (Cl. 164—99)

My invention relates to perforated sheet materials and to methods and apparatus for forming the same. More particularly my invention relates to an improved process and apparatus for manufacturing perforated plasterboard, and has for an object the provision of an improved process and apparatus of this character.

Although my invention in its broadest aspects is not limited thereto, it is particularly applicable to and will hereinafter be described in connection with the manufacture of perforated plasterboard of the general type described and claimed in Patent No. 1,938,354, issued December 5, 1933, to Carlisle K. Roos. In this Roos patent the finished plasterboard, which is formed and dried in a conventional manner, is perforated after drying by subjecting a stack of plasterboards to a simultaneous drilling operation.

While such apparatus and the product formed thereby is to a large extent satisfactory, repeated sharpening of the drills with the consequent expenditure of considerable time and labor has been found to constitute a considerable item of expense. Furthermore, the flexibility of such apparatus is rather limited, the apparatus being designed to receive a predetermined number of boards of predetermined thickness for each drilling or perforating operation. Furthermore, some objection is found to the product thus formed due to the fact that considerable dust is forced into and accumulates in the pores of the plaster core around the hole. When the plasterboard is later erected on ceilings or walls by nailing, a portion of this dust is dislodged and falls into the workman's eyes, which is of course objectionable. In some instances the dust contained in the pores of the plaster core around the perforations may act as a coating and prevent a proper bond between the perforated board and the plaster forced into the perforation during the plastering operation to form keys.

Something is yet to be desired, therefore, in perforated plasterboard and in perforating apparatus of this character, and it is accordingly a further object of my invention to provide an improved product formed in accordance with my improved process of manufacture, by perforating the plasterboard while in its partially moist condition before the plasterboard passes to the drying apparatus. It is likewise an object of my invention to provide an improved apparatus for carrying out the process, which apparatus is capable of continuous operation to provide large quantity production with a low maintenance cost, and which is readily adjustable to receive plasterboards or other sheet material of various widths and thicknesses.

It is a still further object of my invention to provide a process and apparatus of this character in which the plasterboard or sheet material is cleanly and quickly perforated while in a partially set or moist condition without crushing or breaking the surrounding portions of the sheet material.

By perforating the plasterboard before it enters the drying kiln, I am able to speed up the drying operation and therefore reduce the production costs. Quicker drying of the product is made practical by reason of the fact that perforating the board before drying removes a substantial percentage of the weight of material to be dried and by reason of the fact that the perforations increase the turbulence of the drying gas passing over the board. Thus while an unperforated board presents a smooth surface over which the drying gases flow whereby a relatively thick film of cold air or gas is formed next to the board, the stream of gases passing over a perforated board and through the perforations thereof provide a turbulent motion which reduces the thickness of this cold gas film.

Furthermore, in normal operation of a board kiln or dryer the boards are usually separated slightly as they pass through the kiln. With unperforated boards the drying gases pass through the spaces between the boards and contribute to the burning or overdrying of the ends and edges. In drying previously perforated board the currents of gases are not localized at the ends of the board but also pass through the perforations so as to provide a uniform drying of the board without overdrying the ends and edges.

An advantage of primary importance obtained in practicing my invention is found in connection with perforated plasterboards having gypsum cores. In Patent No. 2,044,401, issued June 16, 1936, to Carlisle K. Roos, there is described and claimed a gypsum core composition containing suitable soluble gums and starches which have the property of migrating to the surfaces of the core, especially during the drying operation. These migrating materials upon drying provide hard glazed surfaces, and by perforating the board before drying the core, I obtain a perforated board in which the walls of the perforations are formed of hard, glazed material substantially identical with the end surfaces of the board so as substantially to prevent small pieces of the core from dropping out of the perforations during nailing of the boards to studding or similar supports.

In carrying out my invention in one form a continuous plasterboard sheet having inner and outer covering sheets with a core therebetween of gypsum plaster or similar hydrated composition material is formed in the conventional manner and passed over suitable conveyors to my improved perforating apparatus. The continuous imperforate sheet or board is fed to the perforating apparatus in partially set or moist condition and corresponding portions of the opposite surfaces of the imperforate sheet or board are cut so as to form incompletely severed segments therein, which segments are thereafter forcibly ejected from the plane of the board to form perforations therein. Subsequent to the perforating operation the continuous sheet is cut into desired lengths and subjected to a suitable drying or hardening treatment.

In order efficiently to carry out this process, I provide a perforating machine which preferably comprises spaced roller means adapted to progress sheet material therebetween having means carried by the roller means for cutting corresponding portions of the upper and lower surfaces of the sheet material as it passes between the roller means to form a plurality of incompletely severed segments therein, and means are provided for ejecting the incompletely severed segments from the sheet material to form perforations.

In a specific embodiment of my invention the perforating machine comprises a pair of spaced rollers adapted to pass plasterboard therebetween, each of the rollers having a plurality of circumferentially spaced tubular cutting members extending outwardly from the periphery thereof, the cutting members on each of the rollers being similarly shaped and similarly spaced so that as said rollers are rotated in opposite directions corresponding portions of the upper and lower surfaces of the plasterboard passing between the rollers will be cut by the tubular cutting members to form incompletely severed segments in the plasterboard. Preferably the cutting members on one roller are slightly larger than the corresponding cutting members on the other roller so that a shoulder is formed in each perforation when the incompletely severed segments are ejected. Disposed in the smaller set of tubular cutting members on one of the rollers and slidable therein between a withdrawn and an extended position, I provide a plurality of ejecting plungers, and operating means are provided for momentarily operating the ejecting plungers to their extended positions at the instant that the corresponding cutting members on the rollers are in aligned position whereby the incompletely severed segments are forced out of the plane of the board and into the cutting members on the opposite roller to complete the perforating operation.

For a more complete understanding of my invention, reference should now be had to the drawings in which:

Fig. 4 is an enlarged fragmentary view of two of the perforating wheels with a plasterboard passing therebetween, portions of the wheels being broken away more clearly to illustrate the constructional details of the perforating means;

Figure 1:
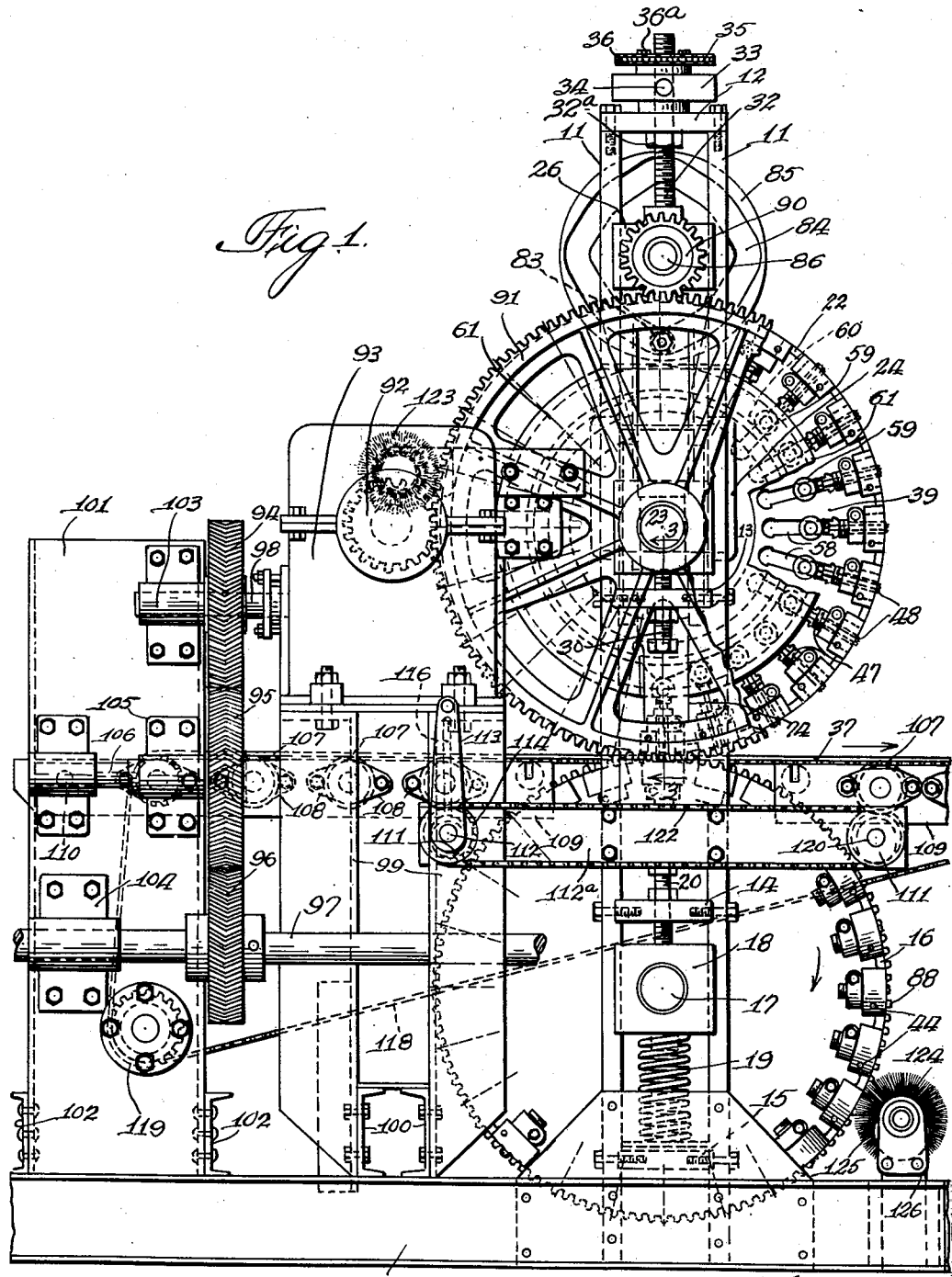
Figure 1 is an elevational end view of a perforating machine embodying my invention, certain parts of the machine being broken away more clearly to illustrate the constructional details.
Figure 2:
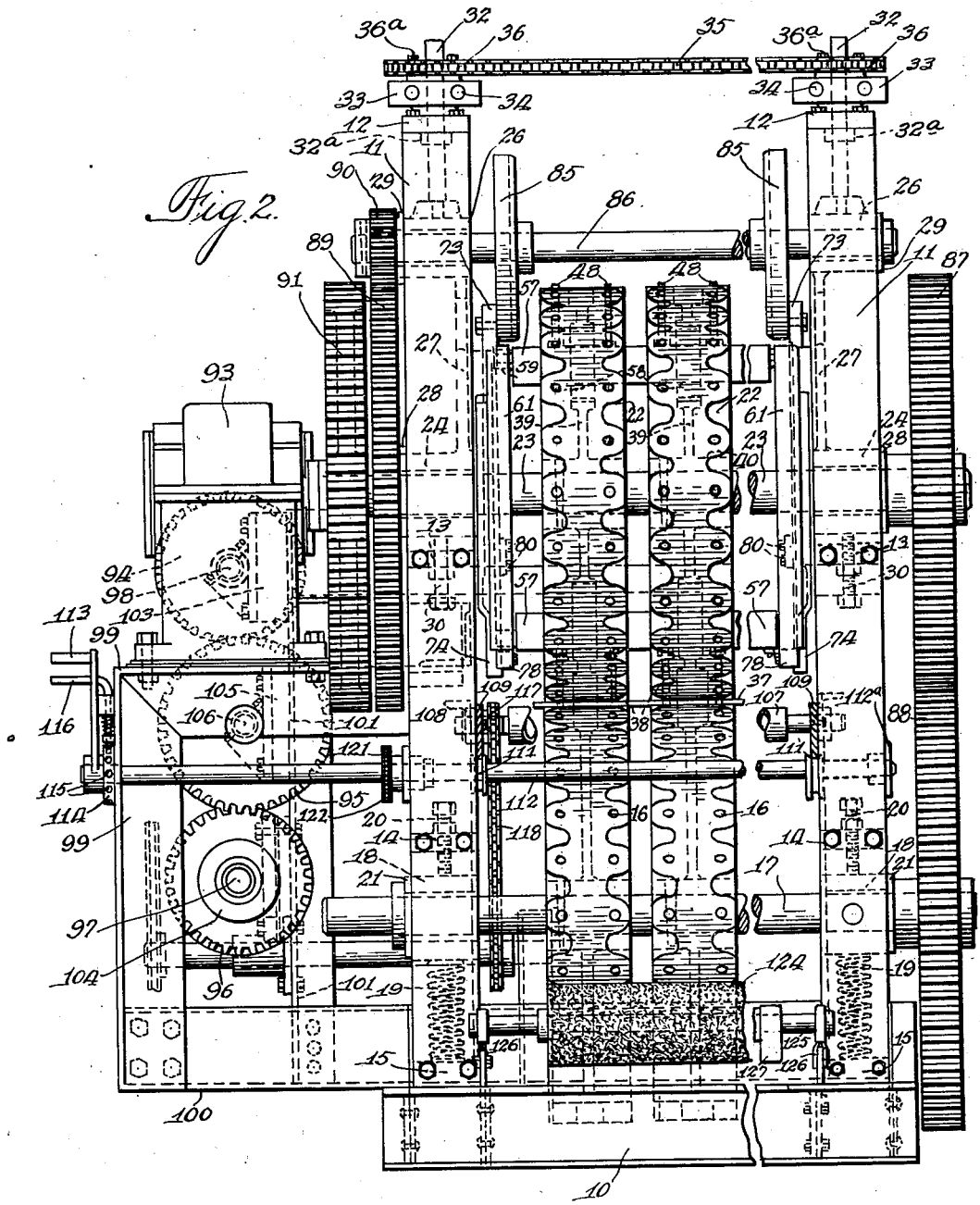
Fig. 2 is an elevational side view of the perforating machine shown in Fig. 1.
Figure 3:
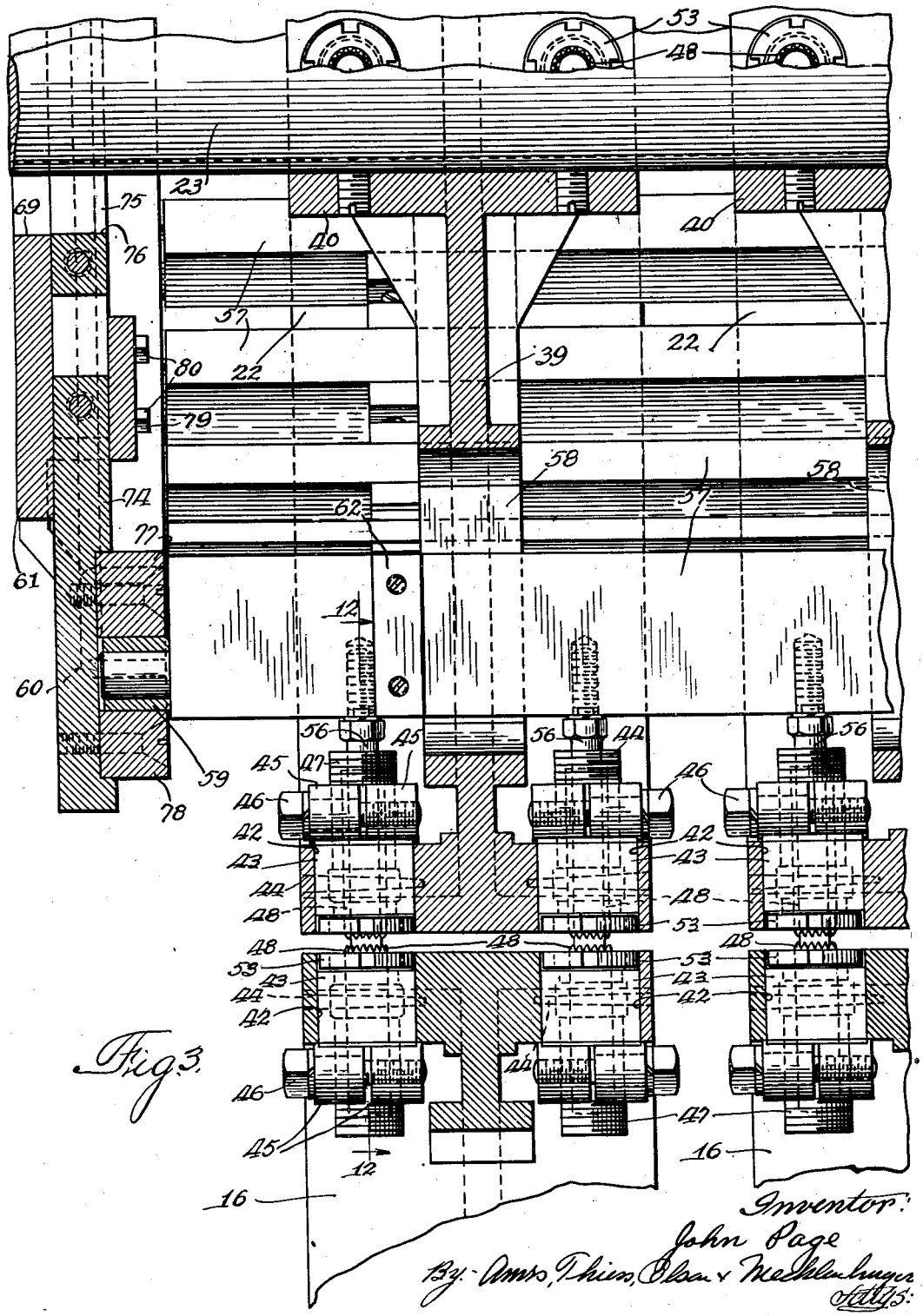
Fig. 3 is an enlarged fragmentary sectional view taken along the line 3—3 of Fig. 1.
Figure 8:
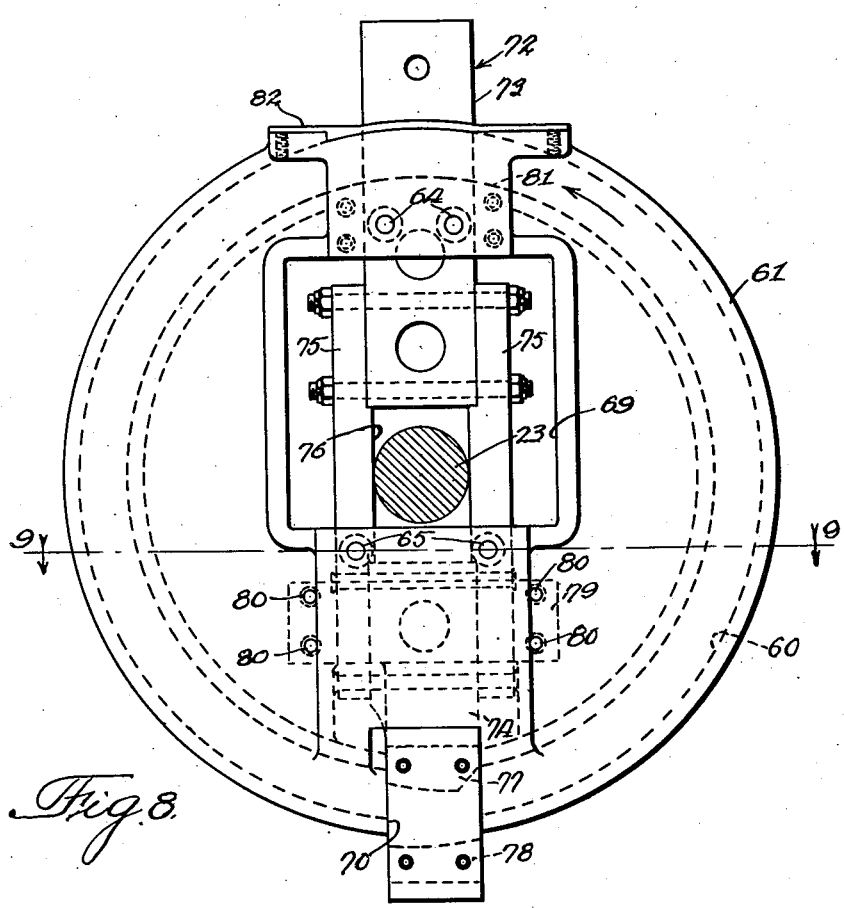
Figure 9:
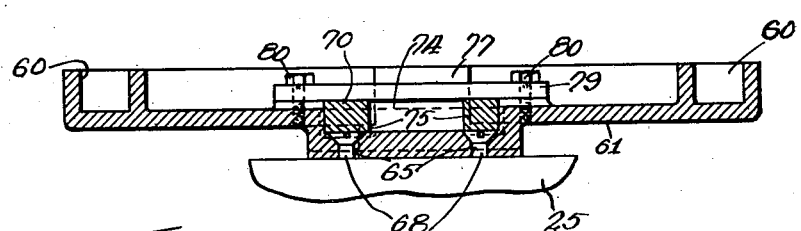

Figs. 5, 6, and 7 are respectively top, back, and side views of an adjustable bearing unit embodied in the machine shown in Figs. 1 and 2;

Fig. 8 is a detail view of a portion of the ejecting means embodied in my improved perforating machine;

Fig. 9 is a sectional view taken along the line 9—9 of Fig. 8;

Figs. 10 and 11 are respectively front and side views of the movable element of the ejecting means shown in Fig. 8;

Fig. 12 is an enlarged fragmentary sectional view taken along the line 12—12 of Fig. 3;

Fig. 13 is a plan view of a perforated plasterboard formed in accordance with my invention;

Fig. 14 is an enlarged fragmentary view of a portion of the board shown in Fig. 13, illustrating in detail the character of the perforations formed therein; and Fig. 15 is a somewhat schematic representation of an apparatus for carrying out my improved process of manufacture.

Referring first to Fig. 15 of the drawings, the complete manufacturing process will first be explained after which the improved perforating apparatus shown in Figs. 1 to 12, inclusive, will be described in detail. In Fig. 15 I have shown, for purposes of illustration, means for manufacturing in a continuous manner plasterboard having a core of gypsum or other hydrated composition, and top and bottom covering sheets or liners of suitable fibrous material such, for example as paper. As shown, the apparatus includes a table or support 150 over which a lower cover sheet or liner 151 is passed, a pair of feed rolls 152 being arranged to draw the sheet 151 from a suitable supply roll 153. As the bottom cover sheet 151 passes over the support 150, a plastic body or mass of gypsum or other hydrated composition in its plastic or manageable state is deposited on the sheet 151, for example from a suitable supply spout 154. Although my invention is not limited thereto, the plastic mass is preferably of the character disclosed in the above Roos Patent No. 2,044,401.

Adjacent the forward end of the support 150 is a pair of forming rolls 155, and as the cover sheet 151 and the plastic mass thereon pass from the support 150, these forming rolls 155 operate on the plastic mass to provide a plastic mass of predetermined thickness, an upper cover sheet 156 being drawn from a suitable supply roll 157 and applied to the upper surface of the formed plastic mass or core by the upper one of the master rolls 155. The apparatus thus far described is entirely conventional and is of the type commonly employed in the art for forming gypsum core plaster board of this character, the formed board 37 passing from the master or forming rolls 155 to a suitable conveyor 158. Although I have shown an apparatus for forming open or raw-edge plasterboard, it will of course be understood that my invention is not limited thereto and may be applied with equal facility to apparatus for forming closed-edge plasterboard in which the liners or cover sheets completely enclose the edges of the core. In such apparatus suitable means are provided in advance of the master rolls for properly scoring and folding the bottom cover sheet 151 so as completely to enclose the core after the upper cover sheet 156 is applied.

The conveyor 158 is of sufficient length so that the plaster core of the board 37 attains a partially set condition before passing to the perforating apparatus, here shown diagrammatically as comprising a pair of perforating rolls 16 and 22, the construction and operation of which will be fully described hereinafter in connection with Figs. 1 to 12, inclusive. From the perforating apparatus the perforated board 37 is fed to suitable cutting means shown diagrammatically as a pair of reciprocating knives 159 which are controlled in any suitable manner so as to sever selected lengths of the perforated board from the continuous sheet, the severed boards then being fed by suitable conveyors 160 and 161 through a drying chamber or kiln 162 wherein the core of the board is completely dried. The resulting product comprises a perforated board, such as the board 37 shown in Fig. 13, having a plurality of apertures 128 (Fig. 14) the character of which will be more fully described hereinafter.

Referring now to Figs. 1 to 12, inclusive, of the drawings, the perforating machine or apparatus which I now consider a preferred form is shown as comprising a base 10 which consists of a plurality of channel-shaped beams secured together at their respective ends to form a substantially rectangular frame. Extending upwardly from two sides of the frame or base 10, and adjacent one end thereof I provide a plurality of upright members 11, two of which are arranged on each side of the frame, each pair of the upright members 11 being connected together by a top cross-piece 12 and a plurality of intermediate cross pieces 13, 14, and 15 so as to form upright supporting frames for the upper and lower perforating means between which the plasterboard 37 is adapted to be passed during the perforating operation.

As shown best in Figs. 1 and 2, the lower perforating means includes a plurality of perforating wheels or rollers 16 supported on and rigidly keyed to a rotatable shaft 17 which is journaled adjacent its opposite ends in bearing members 18 slidably supported between upright members 11. Each of the bearing members 18 is resiliently supported by a spring 19 which normally maintains the bearing member 18 in engagement with a stop screw 20 which extends through and is adjustable with respect to the associated cross-piece 14. As shown, each of the bearing blocks 18 is provided with a flange 21 (Fig. 2) arranged to engage the outer edges of the upright members 11 so as to guide the bearing members 18 for vertical movement with respect to the members 11.

Similarly, the upper perforating means includes a plurality of perforating wheels or rollers 22 which are supported on and rigidly keyed to a rotatable shaft 23 which is journaled, adjacent its opposite ends, in the lower bearings 24 of a pair of similar compound bearing units 25, one of which is shown in detail in Figs. 5, 6, and 7. Referring to Figs. 5, 6, and 7, each compound bearing unit 25 includes, in addition to the lower bearing member 24, an upper bearing member 26 which is spaced from the bearing member 24 and connected thereto by a substantially U-shaped web portion 27. As shown, the bearing members 24 and 26 are provided with flanges 28 and 29 respectively for engaging the outer surface of the upright members 11, to guide the compound bearing unit 25 for slidable vertical movement with respect thereto. In order to properly position the bearing units 25, each of the intermediate cross-pieces 13 is provided with a stop screw 30, the upper end of which abuttingly engages the lowermost surface of the corresponding bearing unit, and the uppermost surface of each bearing unit is tapped or threaded, as indicated by the reference numeral 31 in Figs. 6 and 7, to receive an adjusting screw 32 (Fig. 1).

The end portion of the adjusting screw 32 which enters the tapped hole 31 in the bearing unit is provided with a transverse hole (not shown) so that after the screw 32 and the bearing unit have been assembled a locking pin or cotter key may be inserted through the hole 31a (Figs. 5, 6 and 7) to lock the screw 32 against further rotation. As shown in Figs. 1 and 2, the adjusting screws 32 extend loosely through suitable apertures in the top cross-pieces 12 and threadedly engage suitable lock nuts 32a and adjusting wheels 33, respectively disposed below and above the cross-pieces. It will be apparent that when the lock nuts 32a have been sufficiently loosened rotation of the adjusting wheels 33 which rest upon the cross-pieces 12 is effective to raise or lower the screws 32 and the bearing units 25, the lowering movement thereof being limited by the stop screws 30.

In order to insure that the two bearing units 25 are simultaneously raised and lowered, each of the adjusting wheels 33 is provided with a plurality of sockets 34 into which a raising or lowering bar may be inserted, and the adjusting wheels 33 are connected together by means of an endless chain 35 which meshes with suitable sprockets 36 secured by suitable bolts 36a to the adjusting wheels 33. Thus, when the lock nuts 32a are released and one of the adjusting screws 32 is raised or lowered by rotation of its adjusting wheel 33, the other adjusting screw 32 will be similarly raised or lowered, due to the rotation of its adjusting wheel, by means of the chain 35 and the sprockets 36. After the proper adjustment has been made the lock nuts 32a may again be tightened to prevent further accidental movement of the bearing units.

Normally, the bearing units 25 and the bearing members 18 are so adjusted that the upper and lower perforating wheels 22 and 16 are spaced sufficiently to permit passage therebetween of the sheet of plasterboard to be perforated, such for example as the continuous sheet 37 as described in connection with Fig. 15. The perforating wheels 22 and 16 are positively driven in opposite directions by gearing means to be hereinafter described, and the peripheries of the perforating wheels are provided with a plurality of circumferentially spaced cutting means or tools, the constructional details of which are shown best in Figs. 3, 4, and 12.

Referring now particularly to Figs. 3, 4, and 12, each of the upper perforating wheels 22 comprises, as shown best in Fig. 3, a flanged wheel the peripheral portion of which is connected by a radial web 39 to a hub portion 40 which is keyed to the shaft 23, and the peripheral portion or flange of each wheel is provided with two circumferentially extending rows of apertures or holes 42 for adjustably supporting the cutting or perforating means the constructional details of which are shown best in Fig. 12. Since the perforating or cutting means contained in each of the apertures 42 is identical in construction, only one of these cutting means will be described in detail.

Disposed within each of the apertures 42 I provide a bushing 43, one wall of the aperture 42 and the corresponding wall of the bushing 43 being provided with half-round, tapered notches for receiving a tapered pin 44 which serves to lock the bushing 43 against rotation in the aperture 42. As shown, the bushing 43 extends inwardly from the peripheral flange of the wheel 22, the extending portion being split to provide a plurality of ears 45 arranged to receive a clamping bolt 46 so as to tightly clamp a threaded sleeve 47 which is disposed within the bushing 43 for supporting a tubular cutting tool 48. As shown in Fig. 12, the sleeve 47 is provided at its upper end with an aperture 49 for receiving a pin 50, the inner end of which extends into a notch 51 in the upper end of the cutting tool 48 so as to prevent rotation of the cutting tool with respect to the sleeve 47, and the upper end of the sleeve 47 is provided with a plurality of saw cuts or slots 52 so that when the clamping bolt 46 is tightened the cutting tool 48 will be tightly gripped by the sleeve 47. To properly position the lower end of the cutting tool, I provide a centering nut 53 which threadedly engages the lower portion of the bushing 43 as shown, and which is provided with a plurality of notches 54 for receiving a wrench or other suitable tool.

Although various types of cutting tools may of course be used, I have shown, for purposes of illustration, a cutting tool 48 of the type particularly described and claimed in a co-pending application of Charles Russell Southwick, Serial No. 168,378 filed October 11, 1937, entitled Cutting tool. As shown, the cutting tool 48 is supported in a position such that one end thereof extends outwardly from the periphery of the wheel 22, and this end of the cutting tool is provided with a plurality of knife-edged cutting teeth, as is more fully described in the above identified Southwick application.

As will be apparent upon inspection of Fig. 12, the cutting means associated with the lower perforating wheel 16 is substantially identical with the cutting means just described, with the exception that cutting tools in the wheel 16 are slightly larger in diameter and that the internal diameters of these cutting tools are somewhat enlarged adjacent the rear ends thereof to permit the severed segments to pass freely therethrough after they are ejected from the plane of the board during the perforating operation. In Fig. 12, one of these severed segments is indicated by the reference numeral 55.

It will now be apparent that when the upper and lower perforating wheels 22 and 16 are rotated in opposite directions so as to pass a sheet of plasterboard therebetween, the upper and lower cutting tools will be forced into corresponding portions of the upper and lower surfaces of the board, as shown in Figs. 4 and 12, so as to form partially or incompletely severed segments in the board, and in order forcibly to eject these incompletely severed segments from the plane of the board so as to complete the perforating operation, each of the upper perforating wheels 22 is provided with ejecting means comprising a plurality of reciprocable plungers 56 (Fig. 12) one of which is slidably supported within each of the cutting tools 48. These reciprocable plungers 56 are normally held in a withdrawn position so as not to interfere with the perforating operation of the cutting tools 48, and means are provided for momentarily operating the plungers from their withdrawn positions to an extended position, shown in Fig. 12, at the instant that the cutting tools in the upper and lower perforating wheels reach a position of alignment so as forcibly to eject the severed segments 55 from the plane of the board 37.

In order to provide the above-described reciprocating operation of the plungers 56, the innermost ends of the plungers are threadedly secured to a plurality of operating bars 57 (Figs. 3 and 4) which are mounted for radial movement in a plurality of radially extending circumferentially spaced slots 58 formed in the web portions 39 of the perforating wheels 22. Each of the bars 57 is provided at its opposite ends with rollers 59 arranged to move along substantially circular grooves or tracks 60 formed in a pair of guide discs 61 respectively supported adjacent the opposite ends of the operating bars 57. Axial movement of the operating bars 57 is prevented by suitable stop plates 62 secured to the opposite faces of the bars 57 and arranged to slidably engage the web portions 39 of the wheels 22. Although only one of these stop plates 62 is shown in Fig. 3, it will of course be understood that similar stop plates are provided adjacent the opposite ends of the bars 57.

The discs 61, the detailed construction of which is shown best in Figs. 8 and 9, are rigidly supported on the bearing units 25, the discs 61 being provided with a plurality of tapped holes 64 and 65 through which suitable screws 68 extend into corresponding tapped holes 66 and 67 respectively, in the bearing units 25. (Figs. 6 and 7.) As shown best in Fig. 8, each of the discs 61 is provided with a large aperture 69 through which the shaft 23 extends, and the disc 61 is so supported relative to the shaft 23 that the groove or track 60 is concentric with the shaft. Accordingly, so long as the rollers 59 on the bars 57 move along the circular track 60, the plungers 56 are supported in their respective withdrawn positions.

To effect momentary operation of the plungers 56 to their extended positions at the proper instant, one face of each of the discs 61 is provided with a diametrically extending vertical slot 70 which intersects the circular groove 60 to provide gaps therein. Disposed in the slot 70 in each of the discs 61, I provide a reciprocable member 72 (Figs. 10 and 11) which, as shown, consists of upper and lower plates 73 and 74 secured together by a pair of tie members 75 so as to provide an aperture 76 through which the shaft 23 extends. Adjacent its lowermost end of the plate 74 is provided with a pair of guide plates 77 and 78 which extend outwardly from one face thereof, and which constitute continuations of the side walls of the groove 60 when the reciprocable member 72 occupies its normal position with respect to the disc 61. To guide the reciprocable member 72 in the groove 70 I provide a guide plate 79 which is secured to one face of the disc 61, as for example by the screws 80, and which overlies the groove 70 so as to retain the member 72 therein. Likewise, a guide plate 81 is provided adjacent the upper end of the disc 61, the upper surface of the guide plate being curved, as shown in Fig. 8, to constitute a continuation of one wall of the groove 60. Also, I provide a bearing strip 82 which is secured to the top of the disc 61 and forms a continuation of the other wall of the groove 60.

In Fig. 8 the reciprocable member is shown in its lowermost position, which is the position to which the reciprocable member is operated when it is desired to extend the plungers 56 secured to one of the bars 57. It will be apparent that when the reciprocable member 72 is in its uppermost position, in which position the upper face of the guide plate 78 forms a continuation of the outer wall of the groove 60, the rollers 59 on the ends of the bars 57 may move into the space between the guide plates 77 and 78, whereupon reciprocating movement of the member 72 to the position shown in Fig. 8 effects movement of the particular bar whose rollers 59 lie between the plates 77 and 78 so as to operate the corresponding plungers 56 to the extended position shown in Fig. 12. It is of course necessary to return the reciprocable member 72 quickly to its uppermost position so as to permit the rollers 59 to continue their movement along the groove 60, and in order to provide for such momentary reciprocation of the member 72, I provide cam means so synchronized with the perforating wheels 22 and 16 as to effect this momentary reciprocation of the member 72 whenever corresponding cutting tools 48 on the perforating wheels attain positions of substantial alignment.

Adjacent its upper end the plate 73, which constitutes a part of the reciprocable member 72, is provided with a cam roller 83 which extends into a cam groove 84 formed in one face of a rotatable cam 85. As shown best in Fig. 2, two of these cams 85 are provided mounted on a shaft 86 which is rotatably supported in the upper bearings 26 of the bearing unit 25. The cam groove 84 is so shaped as to effect the desired momentary reciprocating movement of the member 72, the speed of rotation of the shaft 86 being properly correlated with the speed of rotation of the shaft 23 as to provide for operation of the ejecting plungers 56 at the proper instant.

As hereinbefore mentioned, the shafts 17 and 23 must rotate at identical speeds in opposite directions during the perforating operation, and the shaft 86 must rotate at a speed which bears a proper ratio to the speed of the shafts 23 and 17. Accordingly, the shafts 23 and 17 are respectively provided with gears 87 and 88 having a 1–1 ratio, and in addition the shaft 23 is provided with a gear 89 arranged to mesh with a small gear 90 on the shaft 86, the ratio between the gears 89 and 90 being such as to drive the shaft 86 at the desired speed. The shaft 23 also carries a large gear 91 arranged in meshing relation with a driving gear 92 which is connected through suitable speed reducing mechanism contained in a housing 93, and through a plurality of herringbone gears 94, 95, and 96 to a power shaft 97, the herringbone gear 94 being mounted on a shaft 98 which extends outwardly from the gear reducing housing 93. In place of the herringbone gears 94, 95, and 96 I may, of course, use ordinary spur gears.

As shown, the housing 93 which contains the gear reducing mechanism is mounted on supporting brackets 99 which extend upwardly from and are secured to a pair of channel-shaped beams 100 that extend outwardly from one side of the base 10. Similarly, a channel-shaped supporting plate 101 is provided which extends upwardly from and is supported by a pair of beams 102 that extend outwardly from one side of the base 10, suitable bearings 103 and 104 respectively being secured to the supporting plate 101 for supporting the shafts 98 and 97 respectively. Likewise, the supporting plate 101 is provided with a pair of bearings 105 for supporting a shaft 106 on which is mounted the herringbone gear 95 which constitutes an idler gear arranged between the herringbone gears 94 and 96. The power shaft 97 may be connected to any suitable driving means, not shown. In the specific embodiment shown, the herringbone gear 96 is rigidly secured to the power shaft 97, but it will be apparent that if desired the gear 96 may be loosely mounted on the shaft 97 and connected thereto by suitable clutch means.

Arranged on opposite sides of the perforating wheels I provide a feed mechanism and a take-off mechanism for guiding plasterboard to the perforating wheels, and for conveying the plasterboard away from the wheels after perforation thereof. As shown in Fig. 15, the feed and take-off mechanism respectively receive the continuous board 37 from the conveyor 158 and convey the perforated board to the cutting knives 159. As shown best in Figs. 1 and 2, the feed mechanism comprises a plurality of rollers 107, the opposite ends of which are journaled in suitable bearings 108 carried by a pair of movable side members 109. The side members 109 are pivoted adjacent their outer ends on a pin 110 and the ends of the side members adjacent the perforating wheels are supported on eccentrics 111 carried by a shaft 112, one end of which is journaled in a cross-bar 112a which is secured, as shown in Fig. 1, to the upright supporting members 11. The other end of the shaft 112 extends through and is journaled in one of the supporting members 99, the extending end of the shaft 112 being provided with an operating handle 113 and with a clutch mechanism which includes a clutch wheel 114 having a plurality of sockets 115 spaced about the periphery thereof and adapted to receive a spring-biased clutch pin 116. Normally, one end of the clutch pin 116 engages one of the sockets 115 so as to lock the shaft 112 against rotation. If it is desired to raise or lower the feed mechanism, it is necessary only to lift the clutch pin 116 out of the socket 115 in the clutch wheel 114, and then to rotate the crank 113, whereupon the eccentrics 111 will effect the desired raising or lowering movement of the side members 109 carrying the feed rollers 107. As shown, each of the rollers 107 is provided adjacent one end with a sprocket gear 117 arranged to be engaged by an endless chain or link-belt 118 which passes over all of the sprocket gears 117 and around a suitable driving gear 119 (Fig. 1) which is connected in any suitable manner to the power shaft 97 or to other suitable driving means.

The take-off mechanism is substantially identical with the feed mechanism and likewise includes a plurality of the rollers 107 supported between a pair of side members 109 which are pivoted at one end and supported at the other end on eccentrics 111. The eccentrics 111 for the take-off mechanism are supported on a rotatable shaft 120 one end of which is journaled in the end of the cross-bar 112a opposite from the shaft 112. In order to provide for simultaneous raising and lowering of the feed mechanism and the take-off mechanism, the shaft 112 and the shaft 120 are provided with sprocket wheels 121 connected together by an endless belt or chain 122 so that rotation of the shaft 112 effects a simultaneous rotation of the shaft 120.

Continuous cleaning of the perforating or cutting mechanism during operation of the machine is accomplished by means of a pair of rotary brushes 123 and 124 respectively associated with and extending across the peripheral surfaces of the upper and lower perforating wheels 22 and 16. Since these cleaning brushes are substantially identical in construction, only the brush 124 associated with the lower perforating wheel will be described in detail. As shown, this brush 124 is supported on a shaft 125 carried by a pair of upright supporting members 126, and the shaft 125 is provided with a counterweight 127 for providing relative movement between the brush and the perforating wheels upon rotation of the perforating wheels.

It will, of course, be understood that these brushes constitute no part of my invention and that any suitable cleaning mechanism may be provided.

It is now believed that a complete understanding of my invention may be had from a description of the operation of the perforating apparatus when manufacturing perforated plasterboard in the manner described briefly in connection with Fig. 15. Before starting up the perforating machine, it is first necessary to adjust the upper and lower perforating wheels so as to provide the proper clearance therebetween for the sheet material which is to be fed thereto. This adjustment of the perforating wheels is accomplished by operating one of the adjusting wheels 33 to raise or lower the bearing units 25, and by properly adjusting the stop screws 20 and 30 respectively associated with the bearing units 25 and the lower bearings 18.

When the perforating wheels have been adjusted to provide the proper clearance, the feed and take-off mechanisms are adjusted to the proper height by rotating the crank 113 so as to insure that the sheet material 37, fed from the conveyor 158, will be fed to the perforating wheels and properly aligned therewith. Power may now be applied to the power shaft 97 so as to rotate the shafts 17, 23, and 86 to drive the perforating wheels 16 and 22 in opposite directions and to rotate the cam discs 85 in synchronism.

When the sheet of plasterboard 37 or other material to be perforated, is fed onto the feed rollers 107, rotation of the feed rollers causes the plasterboard to pass into engagement with the perforating wheels, and as the plasterboard passes between the perforating wheels the cutting tools on the peripheral surfaces of the wheels are pressed into the upper and lower surfaces of the plasterboard as indicated in Fig. 4, thereby forming incompletely severed segments in the sheet material. Whenever the cutting tools 48 on the upper and lower perforating wheels 22 and 16 reach the aligned position shown in Figs. 4 and 12, the cam rollers 83 on the reciprocating members 72 occupy their respective lowermost positions in the cam grooves 84, shown in Fig. 1, and accordingly the associated bar 57 is moved by the members 72 so that corresponding plungers 56 are momentarily operated to their extended position, corresponding to the position shown in Fig. 12, so as forcibly to eject the incompletely severed segments 55 from the plane of the plasterboard. As the perforating wheels 22 and 16 continue to rotate, the cam groove 84 quickly raises the cam roller 83 so as to withdraw the plungers 56 before the cooperating cutting tools 48 have moved substantially out of alignment.

As the plasterboard passes between the perforating wheels, a plurality of perforations 128 are formed therein, the character of the perforations being shown in Figs. 4 and 14. As stated above, the cutting tools associated with the lower perforating wheels have a slightly larger diameter than the cutting tools of the upper wheels, and accordingly a smooth straight hole is not provided as is the case in drilled board of the type disclosed in the Roos Patent No. 1,938,354 referred to above. Instead, each of the perforations 128 includes a shoulder 128a, as shown best in Fig. 14, which shoulder is highly advantageous in the application of plaster to the board, particularly in the construction of ceilings. If a smooth straight walled perforation is provided by drilling, plaster when applied to the board with a trowel enters the perforation with very little resistance and is not forced outwardly against the sides of the perforation. Accordingly, a poor bond is obtained and when a thick coat of plaster is applied to a ceiling trouble may be encountered due to the plaster sagging. With perforations formed as shown in Fig. 14, the shoulder 128a offers sufficient resistance to the plaster to cause it to contact the walls of the perforation with sufficient pressure to form a satisfactory bond.

Furthermore, by providing somewhat larger cutting tools in the lower wheel I eliminate the possibility of the paper liner on the upper surface of the segment 55 catching on the teeth of the lower cutting tool when the segment 55 is ejected from the plane of the board 37 into the lower cutting tool. The number and spacing of the perforations of course depends upon the arrangement of the perforating wheels and the perforating tools carried thereby, and in Fig. 13 the plasterboard 37 is shown as having been provided with four rows of uniformly spaced perforations 128.

It will now be apparent that I have provided an apparatus which is capable of operation at high speeds and which is adapted to large scale manufacture. The maintenance cost is significantly low, in view of the fact that all of the component parts are readily accessible for adjustment or repair without completely dismantling the apparatus. Furthermore, it will be apparent that the individual cutting tools 48 may readily be removed for sharpening or repair, and that the cutting tools may be readily adjusted radially of the perforating wheels to increase or decrease the amount that the cutting edges of the tools extend beyond the periphery of the wheels so as to provide for the perforation of materials of different thickness, the perforating wheels likewise being adjustable as hereinbefore described to provide for such perforation of matrials of different thickness.

Although a perforating apparatus having two upper perforating wheels and a like number of lower perforating wheels is shown for purposes of illustration, it will of course be apparent that any desired number of perforating wheels may be provided in order to handle sheet materials of greater or less width.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A perforating machine comprising spaced roller means adapted to progress sheet material therebetween, means carried by said roller means for cutting corresponding portions of the upper and lower surfaces of said sheet material to a total depth less than the thickness of the sheet material to form a plurality of incompletely severed segments therein, and means for ejecting said incompletely severed segments from said sheet material to rupture the unsevered portions and form perforations therein.

2. A perforating machine comprising spaced roller means adapted to progress sheet material therebetween, means carried by said roller means for cutting corresponding portions of the upper and lower surfaces of said sheet material to a total depth less than the thickness of the sheet material to form a plurality of incompletely severed segments therein, and reciprocable means for forcibly engaging said incompletely severed segments to rupture the unsevered portions and eject said segments from said sheet material thereby to form perforations in said material.

3. A perforating machine comprising a pair of spaced rollers adapted to progress sheet material therebetween, means carried by said rollers for simultaneously cutting corresponding portions of the upper and lower surfaces of said sheet material to a total depth less than the thickness of the sheet material to form a plurality of incompletely severed segments therein, and a plurality of reciprocable plungers carried by one of said rollers and operable in synchronism therewith for engaging said incompletely severed segments to rupture the unsevered portions within the material and eject said segments from said sheet material thereby to form perforations therein.

4. A perforating machine comprising spaced roller means adapted to pass sheet material therebetween, cutting means extending outwardly from the peripheries of said roller means adapted to be forced into corresponding portions of the upper and lower surfaces of said sheet material, the sum of the extending lengths of corresponding cutting means on said roller means being less than the spacing of said roller means whereby incompletely severed segments are formed therein as said material passes between said roller means, and means for ejecting said incompletely severed segments to form perforations in said sheet material.

5. A perforating machine comprising spaced apart roller means adapted to pass sheet material therebetween, a plurality of tubular cutting members extending outwardly from the peripheries of said roller means for cutting corresponding portions of the upper and lower surfaces of said sheet material, the sum of the extending lengths of corresponding cutting means on said roller means being less than the spacing of said roller means whereby incompletely severed segments are formed therein as said sheet material passes between said roller means, and means for automatically ejecting said incompletely severed segments to form perforations in said sheet material.

6. A perforating machine comprising spaced apart roller means adapted to pass sheet material therebetween, a plurality of tubular cutting members extending outwardly from the peripheries of said roller means for cutting corresponding portions of the upper and lower surfaces of said sheet material to a total depth less than the thickness of the sheet material to form incompletely severed segments therein as said sheet material passes between said roller means, a plurality of plungers journaled for reciprocating movement within certain of said tubular cutting members, and means for operating said plungers from withdrawn positions to extended positions in which said plungers project beyond said cutting members to engage said incompletely severed segments and eject said segments from said sheet material, whereby said sheet material is perforated.

7. A perforating machine comprising a perforating roller, a plurality of circumferentially spaced tubular cutting members each of which includes a cutting edge extending outwardly from the periphery of said roller, a second perforating roller mounted in spaced relation to said first roller and provided with similarly spaced cutting members, means for rotating said rollers in opposite directions to pass a sheet of material therebetween, the sum of the extending length of any cutting member and the extending length of a corresponding cutting member on the other of said rollers being less than the spacing of said rollers so that said cutting members engage corresponding portions of the opposite surfaces of said sheet material to form incompletely severed segments therein, and means associated with one of said rollers for ejecting said incompletely severed segments to rupture the unsevered portions within the material and form perforations in said sheet material.

8. A perforating machine comprising a perforating roller, a plurality of circumferentially spaced tubular cutting members each of which includes a cutting edge extending outwardly from the periphery of said roller, a second perforating roller mounted in spaced relation to said first roller and provided with similarly spaced cutting members, means for rotating said rollers in opposite directions to pass a sheet of material therebetween so that said cutting members engage corresponding portions of the opposite surfaces of said sheet material to form incompletely severed segments therein, a plurality of plungers respectively mounted within the tubular cutting members on one of said rollers, and means for operating each of said plungers from a withdrawn position to an extended position at the instant the associated cutting member is aligned with a corresponding cutting member on the other roller, said plungers upon movement to their extended positions engaging said incompletely severed segments to eject said segments from said sheet material and force said segments into the corresponding tubular cutting members thereby to perforate said sheet material.

9. A perforating machine comprising a perforating roller, a plurality of circumferentially spaced tubular cutting members each of which includes a cutting edge extending outwardly from the periphery of said roller, a second perforating roller mounted in spaced relation to said first roller and provided with similarly spaced cutting members, means for rotating said rollers in opposite directions to pass a sheet of material therebetween so that said cutting members engage corresponding portions of the opposite surfaces of said sheet material to form incompletely severed segments therein, a plurality of plungers respectively mounted for reciprocating movement within the tubular cutting members on one of said rollers, and cam means operated in synchronism with said rollers for reciprocating each of said plungers from a withdrawn position to an extended position to eject said incompletely severed segment at the instant that corresponding cutting members on said rollers are in alignment, said cam means thereupon quickly returning said plunger to said withdrawn position.

10. A perforating machine comprising a pair of spaced rollers adapted to pass plasterboard therebetween, a plurality of circumferentially spaced tubular cutting members extending outwardly from the periphery of one of said rollers, ejecting means in each of said cutting members, operating means normally supporting said ejecting means in withdrawn position for momentarily operating said ejecting means to an extended position when said cutting members attain a predetermined position during rotation of said one roller, a plurality of cutting members extending outwardly from the periphery of the other of said rollers, said cutting members on said pair of rollers being similarly shaped and similarly spaced about the peripheries thereof, and means for rotating said rollers in opposite directions to bring corresponding cutting members on said pair of rollers into alignment with each other at the instant said ejecting means is operated.

11. A perforating machine comprising a pair of spaced rollers adapted to pass plasterboard therebetween, a plurality of circumferentially spaced tubular cutting members extending outwardly from the periphery of one of said rollers, ejecting means in each of said cutting members, operating means normally supporting said ejecting means in withdrawn position for momentarily operating said ejecting means to an extended position when said cutting members attain a predetermined position during rotation of said one roller, a plurality of cutting members extending outwardly from the periphery of the other of said rollers, said cutting members on said pair of rollers being similarly shaped and similarly spaced about the peripheries thereof, and means for rotating said rollers in opposite directions to force said cutting members into corresponding portions of the upper and lower surfaces of the plasterboard passing therebetween so as to form incompletely severed segments in said plasterboard and to bring corresponding cutting members on said pair of rollers into alignment with each other at the instant said ejecting means is operated whereby said incompletely severed segments are ejected from said board to form perforations therein.

12. In combination, a pair of rollers adapted to pass plasterboard therebetween, a plurality of cylindrical cutting members adjustably mounted on the periphery of one of said rollers and provided with extending cutting edges, a plurality of plungers respectively slidably positioned in said cutting members, means normally holding said plungers in a withdrawn position for momentarily extending said plungers beyond the cutting edges of said cutting members when said cutting members attain a predetermined position during the rotation of said rollers, a plurality of similar cylindrical cutting members adjustably mounted on the periphery on the other of said rollers, the external diameters of the cutting members on said other roller being substantially identical to the external diameters of the cutting members on said first roller, and means for rotating said rollers in opposite directions and for bringing the cylindrical cutting members on the first roller into alignment with the corresponding cutting members on said other roller at the moment said plungers are extended.

13. In combination, a pair of substantially parallel shafts, a plurality of flanged equiradial concentric wheels mounted on one of said shafts, a plurality of circumferentially spaced cylindrical cutting members adjustably mounted on the periphery of each of said wheels and having extending cutting edges, a plurality of plungers respectively slidably positioned in said cutting members, means normally holding said plungers in a withdrawn position for momentarily extending said plungers beyond said cutting edges when said cutting edges attain predetermined positions during the rotation of said flanged wheels, a plurality of flanged equiradial concentric wheels mounted on the other of said shafts, a plurality of similar cylindrical cutting members adjustably mounted on the periphery of each of the second named wheels, the cutting edges of said similar cutting members being substantially identical to the cutting edges of the cutting members on said first named wheels, and means for rotating said shafts in opposite directions to bring the cylindrical cutting members on the first named wheels into alignment with the corresponding cutting members on the last named wheels at the moment said plungers are extended.

14. In a perforating machine, the combination of spaced apart roller means adapted to progress a sheet of material therebetween, and means carried by said roller means for cutting corresponding portions of the upper and lower surfaces of said sheet material as said material passes between said roller means, the sum of the lengths of corresponding cutting means on said roller means being less than the spacing of said roller means whereby a plurality of incompletely severed segments are formed in said sheet material.

15. In a perforating machine, the combination of spaced apart roller means adapted to progress a sheet of material therebetween, means carried by said roller means for cutting corresponding portions of the upper and lower surfaces of said sheet material to form a plurality of incompletely severed segments therein, means for adjusting said roller means to vary the spacing thereof, and means for adjusting said cutting means radially of said roller means.

16. A perforating machine comprising spaced roller means adapted to progress sheet material therebetween, means carried by said roller means for cutting corresponding portions of the upper and lower surfaces of said sheet material to form a plurality of incompletely severed segments therein, means for ejecting said incompletely severed segments from said sheet material to form perforations therein, means for adjusting said roller means to vary the spacing thereof, and means for adjusting said cutting means radially of said roller means.

17. In a perforating machine, the combination of a pair of spaced apart rollers adapted to pass sheet material therebetween, and a plurality of tubular cutting members extending outwardly from the peripheral surfaces of said rollers for cutting corresponding portions of the upper and lower surfaces of said sheet material, the sum of the extending length of any cutting member and the extending length of a corresponding cutting member on the other of said rollers being less than the spacing of said rollers, whereby incompletely severed segments are formed therein as said sheet material passes between said rollers.

18. In a perforating machine, the combination of a pair of spaced apart rollers adapted to pass sheet material therebetween, a plurality of tubular cutting members extending outwardly from the peripheral surfaces of said rollers for cutting corresponding portions of the upper and lower surfaces of said sheet material to form incompletely severed segments therein as said sheet material passes between said rollers, means for adjusting said rollers to vary the spacing thereof, and means for adjusting said tubular cutting members radially of said rollers.

19. In a perforating machine, the combination of a shaft, a plurality of perforating wheels on said shaft, circumferentially spaced tubular cutting members having cutting edges extending outwardly from the peripheries of said wheels adapted to be pressed into a body of sheet material passing thereunder as said wheels are rotated, plungers mounted for reciprocation in said cutting tools, operating bars for said plungers extending parallel with said shaft through aligned radial slots in said wheels and connected to corresponding plungers of each wheel, means supporting the opposite ends of said bars including a stationary disc having a circular guide race in which said bars move as said wheels rotate, a radial slot intersecting said guide race, a reciprocable member in said slot having spaced shoulders for completing said guide race, and means for momentarily operating said reciprocable member whenever one of said bars enters the space between said shoulders so as momentarily to reciprocate said corresponding plungers.

20. In a perforating machine, the combination of a roller, circumferentially spaced tubular cutting members having cutting edges extending outwardly from the periphery of said roller adapted to be pressed into a body of sheet material passing thereunder as said roller is driven, ejecting plungers mounted for reciprocation in said cutting members, means for normally supporting said plungers in withdrawn position including a plurality of supporting bars, a disc having a circular guide race in which said bars move as said roller is rotated, a radial slot in said disc intersecting said guide race to form a gap therein, a reciprocable member in said slot having spaced shoulders normally aligned with the walls of said race to bridge said gap, and means for momentarily operating said reciprocable member whenever one of said bars enters the space between said shoulders.

21. A perforating machine comprising spaced roller means adapted to progress sheet material therebetween, means carried by said roller means for cutting corresponding portions of the upper and lower surfaces of said sheet material to form a plurality of incompletely severed segments therein, a plurality of plungers carried by one of said rollers for reciprocating movement between a withdrawn and an extended position for ejecting said incompletely severed segments from said sheet material to form perforations therein, means for normally supporting said plungers in said withdrawn position including a plurality of axially extending bars, a disc having a circular guide race along which said bars move as said roller is rotated, a radial slot in said disc intersecting said guide race to form a gap therein, a reciprocable member in said slot having spaced apart shoulders normally aligned with the walls of said race to bridge said gap, and means for operating said reciprocable member quickly to move one of said plungers between said withdrawn and extended positions whenever a corresponding one of said bars enters the space between said shoulders.

22. The method of manufacturing perforated sheet material which comprises continuously progressing an imperforate body of sheet material, cutting at predetermined intervals corresponding portions of the opposite surfaces of said continuously progressed imperforate body of sheet material to a total depth less than the thickness of the material to form incompletely severed segments therein, and thereafter forcibly ejecting said incompletely severed segments from said continuously progressed sheet material to rupture the unsevered portions within the material and form perforations therein.

23. The method of manufacturing perforated plasterboard which comprises simultaneously cutting a plurality of corresponding portions of the opposite surfaces of an imperforate plasterboard to form incompletely severed segments therein, and thereafter ejecting said incompletely severed segments to form perforations in said plasterboard.

24. The process of perforating a sheet of plasterboard which comprises forcing a substantially ring-shaped cutting edge partially through said board, simultaneously forcing a similarly shaped cutting edge partially through said board from the opposite surface thereof to form a partially severed segment, and subsequently applying pressure to said partially severed segment to eject the same from the plane of said board.

25. A perforating machine comprising means for continuously progressing a sheet of material, means for cutting corresponding portions of the upper and lower surfaces of sheet material to a total depth less than the thickness of the sheet material to form incompletely severed segments therein, and reciprocable means operable in timed relation with said cutting means and said progressing means for forcibly engaging said incompletely severed segments to rupture the unsevered portions and eject said segments from said continuously progressed sheet material to form perforations therein.

26. A perforating machine comprising top and bottom sets of hollow cutting members, means for continuously progressing a sheet of imperforate material between said sets of cutting members, means for pressing said sets of cutting members into said sheet material to cut corresponding portions of the upper and lower surfaces of said continuously progressed sheet material, whereby incompletely severed segments are provided therein at predetermined intervals, a plurality of reciprocably operable plungers journaled in one set of cutting members, and means for operating said plungers in timed relation with said cutting members and said progressing means from withdrawn positions to extended positions in which said plungers project beyond said one set of cutting members to engage said incompletely severed segments and rupture and eject said segments from said continuously progressed sheet material into the other set of cutting members, whereby said sheet material is perforated.

27. A perforating machine comprising top and bottom sets of hollow cutting members, means for pressing said sets of cutting members into a body of sheet material to cut corresponding portions of the upper and lower surfaces of said body to a total depth less than the thickness of the sheet material, whereby incompletely severed segments are provided therein, the cutting members of one of said sets being larger in cross section than the cutting members of the other, and means reciprocably operable in the cutting members of said other set for engaging said incompletely severed segments to rupture the unsevered portions of said body between said corresponding cuts to eject said incompletely severed segments from the plane of the sheet material into the cutting members of said one set, whereby perforations having internal annular shoulders of appreciable width are formed in said sheet material by said rupture of said unsevered portions.

JOHN PAGE.